Figure 1:
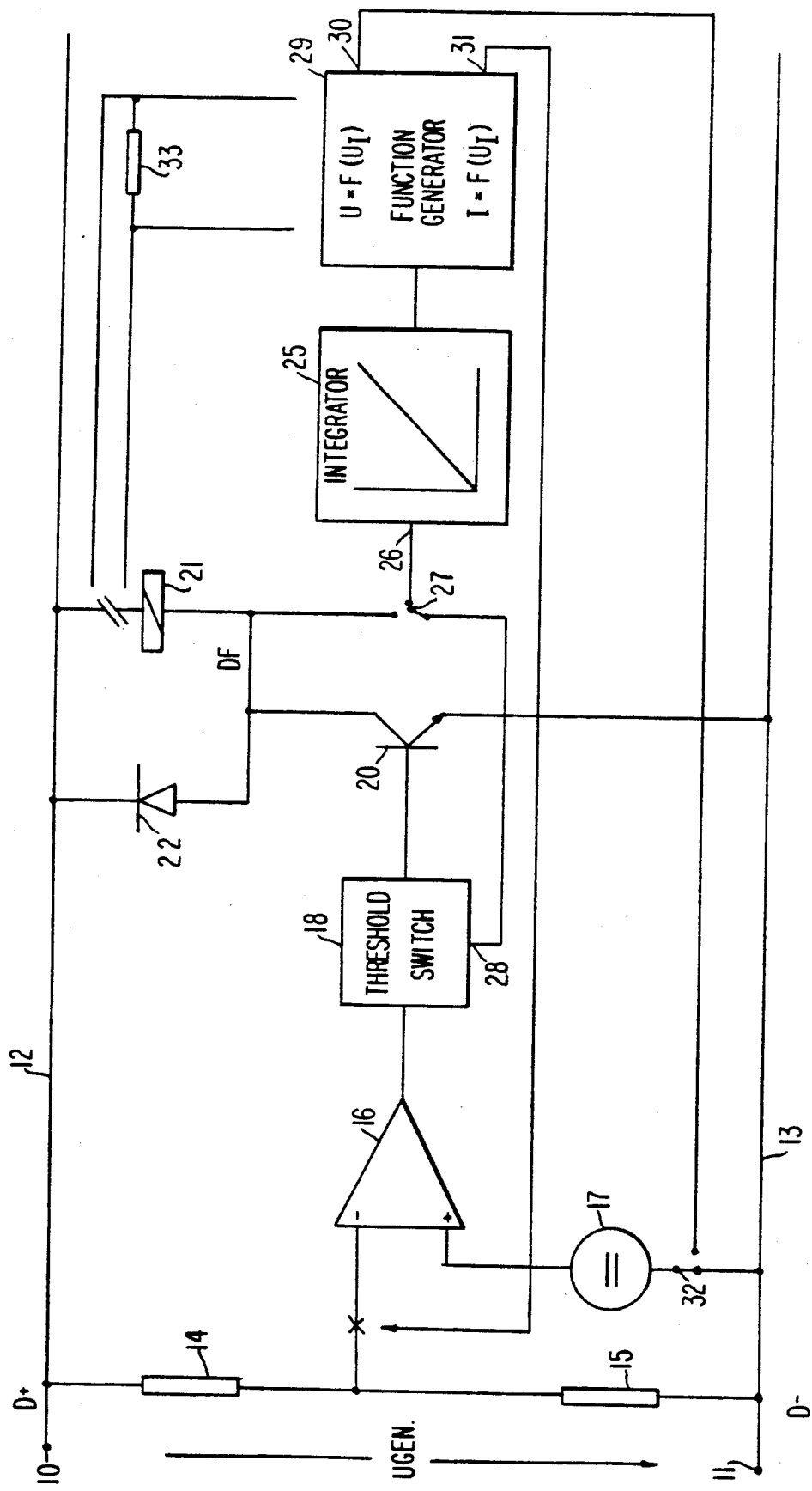

United States Patent [19]

Conzelmann et al.

[11] Patent Number: 5,013,996
[45] Date of Patent: May 7, 1991

[54] VOLTAGE REGULATOR FOR A GENERATOR

[75] Inventors: Gerhard Conzelmann, Leinfelden-Echterdingen; Karl Nagel, Gomaringen; Walter Kohl, Bietigheim, all of Fed. Rep. of Germany

[73] Assignee: Robert Bosch GmbH, Fed. Rep. of Germany

[21] Appl. No.: 314,578
[22] PCT Filed: Apr. 3, 1987
[86] PCT No.: PCT/DE87/00147
  § 371 Date: Jan. 25, 1989
  § 102(e) Date: Jan. 25, 1989
[87] PCT Pub. No.: WO88/01110
  PCT Pub. Date: Feb. 11, 1988

[30] Foreign Application Priority Data

Jul. 25, 1986 [DE] Fed. Rep. of Germany ....... 3625211

[51] Int. Cl.5 .................. H02J 7/14; H02P 9/30
[52] U.S. Cl. ........................... 322/28; 322/25; 322/73
[58] Field of Search ............... 322/28, 73, 25

[56] References Cited

U.S. PATENT DOCUMENTS

| | | | |
|---|---|---|---|
| 3,868,558 | 2/1975 | Winkley et al. | 322/28 X |
| 4,233,556 | 5/1978 | Nagel et al. | 322/28 |
| 4,555,657 | 11/1985 | Kato et al. | 322/28 X |
| 4,716,355 | 12/1987 | Morishita et al. | 322/73 X |

FOREIGN PATENT DOCUMENTS 2369734 5/1978 France.
1174875 12/1969 United Kingdom.

Primary Examiner—R. J. Hickey
Attorney, Agent, or Firm—Michael J. Striker

[57] ABSTRACT

A voltage regulator for generators is proposed which, compared with a voltage regulator known, for example, from DE-PS 27 38 897, is supplemented in such a manner that an integral component corresponding to the relative operating time of the field current is formed and this component is fed into the actual control loop. The relative operating time of the field current in this arrangement can be obtained more or less directly from the switching characteristic of the switching transistor (20) for the field current or by means of a sensing resistor (33) in series with the exciter winding (21).

4 Claims, 2 Drawing Sheets

VOLTAGE REGULATOR FOR A GENERATOR

PRIOR ART

The invention is based on a voltage regulator of the generic type of the main claim. From DE-PS 27 38 897, a voltage regulator for a generator is known, having a differential amplifier for comparing the generator voltage with a reference voltage and a subsequent series circuit consisting of at least the elements of smoothing capacitor, threshold stage, controllable semiconductor switch and generator exciter winding.

It has been found that the statics of the two-position controller according to the specified prior art, which operates purely proportionally, become more and more unsatisfactory as the rated current of the generators increases, especially since the system must be forced to operate at a higher frequency than its natural frequency in order to prevent the so-called lamp flickering.

It is therefore the object of the invention to create a voltage regulator which operates satisfactorily in all operating ranges and for almost any rated current and, in addition, can also be easily integrated with a view to large-scale production.

ADVANTAGES OF THE INVENTION

The voltage regulator according to the invention is found to be optimum with respect to its regulating characteristic even at high rated currents.

Other advantages of the invention are obtained from the description following of an illustrative embodiment in conjunction with the subclaims.

DRAWING

Figure 3:
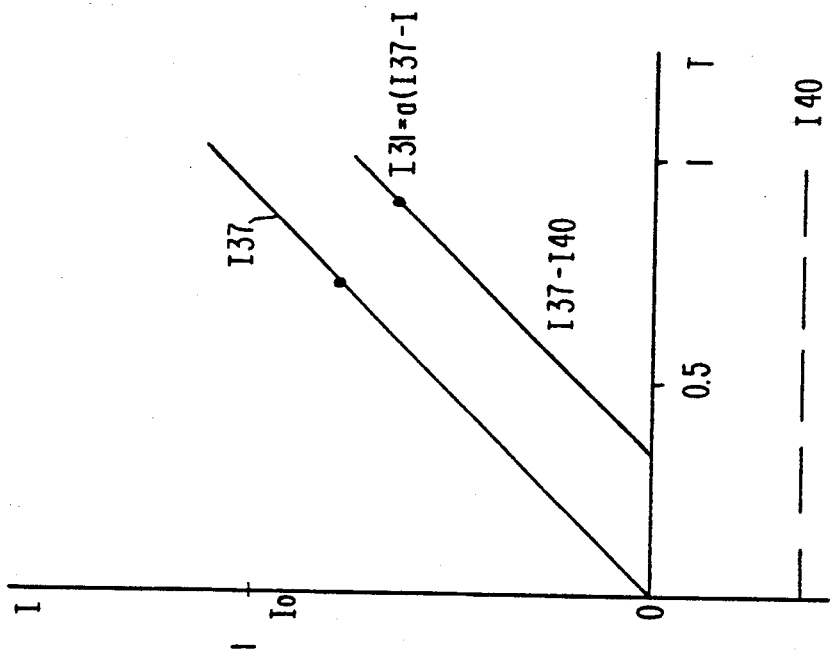
Figure 2:
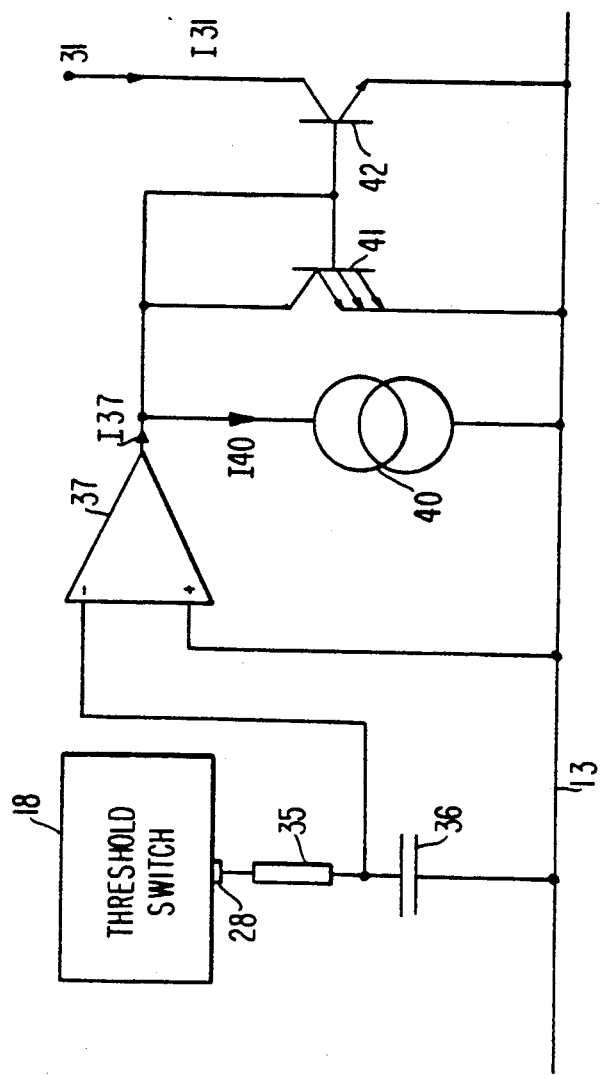

FIG. 1 shows a rough block diagram of an illustrative embodiment of the voltage regulator according to the invention, FIG. 2 shows an example of a detail of the part according to the invention, and FIG. 3 shows a signal diagram so that the subject matter of FIG. 2 can be more easily understood.

DESCRIPTION OF THE ILLUSTRATIVE EMBODIMENT

The illustrative embodiment relates to a voltage regulator according to DE-PS 27 38 897, supplemented by the parts according to the invention. In FIG. 1, the input terminals of the voltage regulator, which carry the technical designations D+ and D−, are designated by 10 and 11. Both terminals 10 and 11 are connected to lines 12 and 13 between which a voltage divider consisting of two resistors 14 and 15 is located. The tap of the voltage divider is conducted to the negative input of an operational amplifier 16 to the positive input of which a reference voltage source 17 is connected which, in turn, is again connected to the line 13. On the output side, the operational amplifier 16 is followed by a circuit block 18 which can comprise, for example, the threshold switch known from DE-PS pb 27 38 897 and the other elements of switching stage and amplifier. A subsequent switching transistor 20 is connected in series with an exciter winding 21 of a generator between the two lines 12 and 13. A freewheeling diode 22 is also located in parallel with the exciter winding 21.

25 designates an integrator which receives the switching signal to be integrated via its input 26 either from an output 28 of the circuit block 18 or from the junction of exciter winding 21 and switching transistor 20. The integrator 25 is followed by a function generator 29. The latter has either a voltage output 30 having a small internal resistance or a current output 31 having a very high internal resistance. The current output 31 must be connected to the negative input of the operational amplifier 16 or else the voltage output 30 in series with the reference source 17 at 32.

The operation of the basic system of the voltage regulator according to FIG. 1 is known, for example, from DE-PS 27 38 897 as already explained. The input signal between the two terminals 10 and 11 is referred to a reference value from the reference voltage source 17 by means of the operational amplifier 16 and, depending on the output signal of the latter, the circuit block 18 generates a clocked drive signal for the switching transistor 20 which, in turn, determines the current flow/current flow interval ratio. of the exciter winding 21 of the generator. The duty ratio of the exciter current is thus selected depending on the input signal between terminals 10 and 11 and the required voltage is lined up by this means. The additional circuit according to the invention then provides that the switching signal of the exciter current is more or less directly integrated and a signal dependent thereon influences the input circuit of the voltage regulator. In FIG. 1, for example, 26 is connected to 28 at 27. The switching signal for the integrator is thus picked up after a threshold switch located in circuit block 18.

Another possibility for the input signal of the integrator 25 is to select the signal resulting at the junction of the exciter winding 21 and switching transistor 20 for the integration.

The subsequent function generator 26 is used for matching the required voltage conditions to the actual situations. This is because it is not advantageous to process the integrator output signal directly since, on the one hand, the generator current is not sufficiently well represented by the mean field current but, on the other hand, the overall generator/on-board supply system also contains nonlinearities which must be taken into consideration. The function generator 29 can be used for adjusting the signals at the outputs 30 or 31 in such a manner that the deviation of the voltage of the on-board supply system becomes approximately minimum in the entire operating range for almost any generators and on-board supply systems.

The phase relationship of the system according to FIG. 1 is shown for a circuit block 18 which does not rotate the phase. The phase relationship formed by the integrator 25 and the function generator 29 must be selected in such a manner that, as the relative operating time T of the switching transistor 20 increases, either a current increasing with operating time is subtracted from the inverting input of the operational amplifier 16 or a voltage increasing with the operating time T is connected in series with the reference voltage source 17. Naturally, the expert can also select other points in the circuit for feeding in the integral component, taking into consideration the phase relationship.

Instead of connecting a function generator 29 to the output of the integrator 25, the integrator 25 itself can be constructed to operate nonlinearly.

As a rule, the integrator 25 will exhibit a capacitor. Instead of this capacitor, however, the inductance of the exciter winding 21 can also be utilized since the current flowing through it already represents a mean value. This can be converted by means of a low-resistance sensing resistor 33 into a voltage to be processed. In this arrangement, the sensing resistor 33 can be located in the current supply line of the exciter winding 21. In the example of FIG. 1, it would be connected between the exciter winding 21 and line 12. On the other hand, however, placement on the opposite side of the exciter winding 21 is also possible.

FIG. 2 shows a possible illustrative embodiment for integrator 25 and function generator 29 with the connection 26, 27 and 28 which can be seen in FIG. 1. A resistor 35, together with a capacitor 36, forms the integrating section 25 between the output 28 of the circuit block 18 and line 13. The voltage across the capacitor 36 is conducted to an operational amplifier 37 which converts the voltage across the capacitor 36, representing the integral, into a current I37. The components 35, 36 and 37 thus correspond to the integrator 25 of FIG. 1. In the subject-matter of FIG. 2, the function generator 29 consists of a constant current source 40 between the output of the amplifier 37 and the line 13 in conjunction with a current balancing circuit, formed of two transistors 41 and 42, the output current I31 of which is fed in at the inverting input of the operational amplifier 16 of FIG. 1. The current I40 of the current source 40 is subtracted from the current I37 of the integrator and the difference is supplied to the current balancing circuit of transistors 41 and 42 which is constructed as current divider so that it can be more easily matched. The transistor 41 contains n-times the number of emitters of transistor 42 with 1 =n =20, one or more of which can also be constructed to be removable for calibrating the integral correction in the case of wafer samples.

The operation of the function generator 29 is shown in FIG. 3 which represents the corresponding currents as functions of the relative operating time T of the switching transistor 20, or also of the mean field current which, of course, is directly proportional to T. The currents I and also T are in each case normalized. The output current I37 is assumed to rise linearly with the relative operating time T of the transistor 20 from 0 to IO (corresponding to 1). The constant current I40 —in this example 0.33 ×IO —is subtracted from this output current. As the integrator output current I37 drops below the constant current I40, the transistor 42 does not yet see any current. It is only when the integrator current I37 becomes greater that the current $$I31 = a(I37 - I40), \text{ for } I31 = 0,$$

flows. a designates the transformation factor of the current balancing circuit.

If required, other arbitrarily complex functions can be formed using the means of electronic circuit technology. In addition, the temperature responses resulting from circuit and system can be correspondingly compensated.

We claim:

1. A voltage regulator for a generator, particularly for use in motor vehicles, comprising a control loop; means for generating a mean field current in an exciter winding of the generator and including means for switching on and off the current flowing through the exciter winding to keep the generator voltage approximately constant, independently of load and rotational speed; means for generating from a relative operating time (T) of the mean field current generating means an integral signal component; means for feeding back the integral signal component to the control loop; and means for continously and proportionally varying the integral signal component in accordance with the relative operating time.

2. A voltage regulator as defined in claim 1, wherein the means for generating an integral signal component includes an integrator having an output, the varying means comprising a function generator connected with said output for producing a compensating signal in dependency on a non-linear relationship between the relative operating time (T) and the fed back integral signal component.

3. A voltage regulator as defined in claim 1, wherein the means for generating an integral signal component includes a non-linearly operating integrator.

4. A voltage regulator as defined in claim 1, wherein the means for generating an integral signal component includes a current sensing resistor connected in series with the exciter winding, and the integral signal component is obtained from the voltage drop across the sensing resistor.

* * * * *